US012040579B2

(12) United States Patent
Nowastowski-Stock et al.

(10) Patent No.: US 12,040,579 B2
(45) Date of Patent: Jul. 16, 2024

(54) TRANSFORMER TERMINAL

(71) Applicant: CONTA-CLIP VERBINDUNGSTECHNIK GMBH, Hövelhof (DE)

(72) Inventors: Jörg Nowastowski-Stock, Detmold (DE); Frank Ludolph, Geseke (DE)

(73) Assignee: CONTA-CLIP VERBINDUNGSTECHNIK GMBH, Hövelhof (DE)

( * ) Notice: Subject to any disclaimer, the term of this patent is extended or adjusted under 35 U.S.C. 154(b) by 310 days.

(21) Appl. No.: 17/605,638

(22) PCT Filed: Apr. 8, 2020

(86) PCT No.: PCT/DE2020/100288

§ 371 (c)(1), (2) Date: Oct. 22, 2021

(87) PCT Pub. No.: WO2020/216407

PCT Pub. Date: Oct. 29, 2020

(65) Prior Publication Data

US 2022/0247095 A1 Aug. 4, 2022

(30) Foreign Application Priority Data

Apr. 24, 2019 (DE) ..................... 20 2019 102 309.0

(51) Int. Cl.

*H01R 4/48* (2006.01)
*H01R 4/02* (2006.01)

(Continued)

(52) U.S. Cl.

CPC ............... *H01R 4/48* (2013.01); *H01R 4/023* (2013.01); *H01R 9/2658* (2013.01); *H01R 13/518* (2013.01)

(58) Field of Classification Search

CPC ................................ H01R 4/48; H01R 4/4809

(Continued)

(56) References Cited

U.S. PATENT DOCUMENTS

| | | | | |
|---|---|---|---|---|
| 5,529,516 | A | 6/1996 | Wu et al. | |
| 5,726,619 | A | 3/1998 | Hohorst et al. | |
| 6,806,424 | B2 * | 10/2004 | Gerving ............... | H01R 4/4809 174/59 |

(Continued)

FOREIGN PATENT DOCUMENTS

| | | | |
|---|---|---|---|
| CN | 102842467 | A | 12/2012 |
| CN | 203503895 | U | 3/2014 |

(Continued)

OTHER PUBLICATIONS

International Search Report and Written Opinion of the International Searching Authority, issued in PCT/DE2020/100288, mailed Jul. 16, 2020; ISA/EP.

*Primary Examiner* — Harshad C Patel

(74) *Attorney, Agent, or Firm* — Harness, Dickey & Pierce, P.L.C.

(57) ABSTRACT

The invention relates to a transformer terminal comprising: an insulating housing which has an integrally designed main body (1) and a cover (2) which can be detachably mounted on the main body (1); a mounting device which is formed on the insulating housing and is designed to mount the insulating housing on a transformer, a first electrical conductor connection (4) for a first potential, comprising a first electrical connection assembly (8) having a first bus bar (8*a*); a first spring-force clamping connection which is formed on first bus bar (8*a*) and is designed to clamp a first conductor for electrical connection to the first bus bar (8*a*); and a first winding wire connection (8*c*) for electrically connecting a first winding wire of the transformer to the bus bar (8*a*), the (Continued)

first winding wire connection (8*c*) being integrally moulded on the first bus bar (8*a*); and a second electrical conductor connection (5) for a second potential, which is different from the first potential, the first and second electrical conductor connections (4, 5) being electrically insulated from one another, the second electrical conductor connection comprising a second electrical connection assembly (9) tuning a second bus bar (9*a*); a second spring-force clamping connection (9*b*) which is formed on the second bus bar (9*a*) and is designed to clamp a second conductor for electrical connection to the second bus bar (9*a*); and a second winding wire connection (9*c*) for electrically connecting a second winding wire (9*c*) of the transformer to the bus bar (9*a*), the second winding wire connection (9*c*) being integrally moulded on the second bus bar (9*a*). The first electrical connection assembly (8) is arranged in a first installation space which is formed on the main body (1) in the region of a lateral face and has a first mounting opening toward said lateral face, and the second electrical connection assembly (9) is arranged in a second installation space (10*b*) which is formed on the main body (1) in the region of an opposite lateral face and has a second mounting opening (19*b*) toward said lateral face, the second installation space being separated front the first installation space.

12 Claims, 6 Drawing Sheets

(51) Int. Cl.
*H01R 9/26* (2006.01)
*H01R 13/518* (2006.01)

(58) Field of Classification Search
USPC .......... 438/708
See application file for complete search history.

(56) References Cited

U.S. PATENT DOCUMENTS

| | | | | |
|---|---|---|---|---|
| 6,911,602 | B2 * | 6/2005 | Conrad | H01R 9/2691 439/441 |
| 7,544,103 | B2 * | 6/2009 | Walter | H01R 4/48365 439/441 |
| 8,742,270 | B2 * | 6/2014 | Hatano | H01H 71/10 200/43.16 |
| 8,961,201 | B2 * | 2/2015 | Griese | H01R 9/2675 439/121 |
| 9,136,083 | B2 * | 9/2015 | Brakefield | H01H 85/22 |
| 9,142,904 | B2 * | 9/2015 | Martin | H01R 13/4223 |
| 9,413,082 | B2 * | 8/2016 | Gassauer | H01R 4/48365 |
| 9,455,510 | B2 * | 9/2016 | Busch | H05K 7/1469 |
| 9,472,871 | B2 * | 10/2016 | Lin | H01R 12/53 |
| 9,793,636 | B2 * | 10/2017 | France | H01R 9/2491 |
| 11,784,447 | B2 * | 10/2023 | Xue | A47B 96/06 439/343 |
| 2008/0096441 | A1 * | 4/2008 | Eppe | H01R 4/48275 439/816 |
| 2008/0248698 | A1 | 10/2008 | Pizzi | |
| 2010/0081316 | A1 * | 4/2010 | Eppe | H01R 4/48365 439/441 |
| 2017/0331220 | A1 | 11/2017 | Sebastián Martín et al. | |

FOREIGN PATENT DOCUMENTS

| | | | |
|---|---|---|---|
| CN | 104952640 | A | 9/2015 |
| CN | 105122550 | A | 12/2015 |
| CN | 106068582 | A | 11/2016 |
| CN | 107465005 | A | 12/2017 |
| CN | 107592951 | A | 1/2018 |
| CN | 108075254 | A | 5/2018 |
| DE | 19508695 | B4 | 3/2004 |
| DE | 202016103581 | U1 | 7/2017 |
| EP | 2434581 | A1 | 3/2012 |
| EP | 2538493 | A2 | 12/2012 |
| FR | 2642906 | A1 | 8/1990 |
| JP | H0963860 | A | 3/1997 |
| JP | 2000133363 | A | 5/2000 |
| JP | 2014232612 | A | 12/2014 |

* cited by examiner

TRANSFORMER TERMINAL

CROSS-REFERENCE TO RELATED APPLICATIONS

This application is a 371 U.S. National Stage of International Application No. PCT/DE2020/100288, filed on Apr. 8, 2020, which claims priority to German Application No. 20 2019 102 309.0, filed on Apr. 24, 2019. The entire disclosures of the above applications are incorporated herein by reference.

BACKGROUND OF THE INVENTION

Transformer terminals are used to provide an electrical connection for one or more winding wires of a transformer.

A transformer terminal is known for example from the document DE 195 08 695 B4. A plurality of electrical conductor connections are provided on a multipart main body of an insulating housing. The electrical conductor connections have a multipart bus bar and a spring-force clamping connection for the purpose of clamping an electrical conductor end and connecting it electrically to the bus bar. Internal connection contacts are provided to enable connection to a winding wire of the transformer, and these are mounted with an upper part of the bus bar when the transformer terminal is mounted.

SUMMARY OF THE INVENTION

The object of the invention is to provide a transformer terminal that can be produced more simply and with less time expenditure.

This object is solved with a transformer terminal according to the independent claim 1. Embodiments thereof are the subject matter of dependent claims.

According to one aspect, a transformer terminal with an insulating housing is created comprising an integrally designed main body, and a cover which can be detachably mounted on the main body. The transformer terminal has a mounting device, which is formed on the insulating housing, on the main body for example, and is configured to mount the insulating housing on a transformer. A first electrical conductor connection is provided for a first potential, the first electrical conductor connection comprising a first electrical connection assembly with the following features: a first bus bar, a first spring-force clamping connection which is formed on the first bus bar and configured to clamp a first conductor for electrical connection to the first bus bar, and a first winding wire connection for electrically connecting a first winding wire of the transformer to the bus bar, the first winding wire connection being integrally moulded on the first bus bar. A second electrical conductor connection is provided for a second potential, which is different from the first potential, the first and second electrical conductor connections being electrically insulated from each other. The second electrical conductor connection comprises a second electrical connection assembly which comprises the following: a second bus bar, a second spring-force clamping connection which is formed on the second bus bar and configured to clamp a second conductor for electrical connection to the second bus bar, and a second winding wire connection for electrically connecting a second winding wire of the transformer to the bus bar, the second winding wire connection being integrally moulded on the second bus bar. The first electrical connection assembly is arranged in a first installation space which is formed on the main body in the region of a lateral face with a first mounting opening toward the lateral face. The second electrical connection assembly is arranged in a second installation space which is formed on the main body in the region of an opposite lateral face with a second mounting opening toward the opposite lateral face and separated from the first installation space.

The integrally designed main body may be a single piece. The main body may be designed as an injection-moulded part for example.

When the main body is viewed from the front, the first and the second electrical conductor connections may be arranged side-by-side and adjacent to each other.

The first and the second spring-force clamping connections may each be designed as a socket spring connection. With the socket spring connection, it is provided that the electrical conductor for connection, particularly a conductor end, is pressed against the bus bar by the spring force of the spring in the socket spring connection, wherein a direct physical contact is formed between the bus bar and the conductor end. In this or other embodiments, it may be provided that with the spring-force clamping connection the device is designed for toolless connection of the conductor by means of the electrical conductor connection.

The first installation space may be equippable with the first electrical connection assembly through the first mounting opening in the region of the lateral face, and the second installation space may be equippable with the second electrical connection assembly through the second mounting opening in the region of the opposite lateral face. When the transformer terminal or the main body is viewed from the front, the first and the second mounting openings are arranged in the region of the lateral faces opposite to each other. The assembly openings formed in these sections enable the first and the second electrical connection assemblies to be introduced into the assigned installation space, from the insertion direction side in each case. This makes it possible to equip the main body with both the first and the second electrical connection assemblies at the same time, during manufacture, for example.

A first spring of the first spring-force clamping connection in the first installation space may at least partially encompass a first support mandrel configured to prevent an overextension of the spring, and a second spring of the second spring-force clamping connection in the second installation space may at least partially encompass a second support mandrel configured to prevent an overextension of the spring. In this context, a spring bend of the respective spring may at least partially encompass the support mandrel or mandrel. As a designed projection, the support mandrel prevents mechanical overload of the respective spring, which thus retains its functionality. From a side view on the main body, the support mandrel may have a teardrop-shaped cross-sectional area.

The first and the second electrical connection assemblies may each be constructed identically, at least with regard to the following components: the bus bar, the spring-force clamping connection and the winding wire connection. This enables the electrical connection assemblies to be produced according to a single construction type, making it possible to further simplify the manufacturing process. The connection assemblies of the same construction type may be used both for the first and for the second electrical conductor connection.

The first and the second winding wire connections may be formed with a solder connection. The solder connection may be formed with a solder tail, which may have an open or closed solder eyelet.

The first and the second winding wire connections may be arranged so as be exposed when the cover is removed from the main body, in which case also an interspace between the first and the second winding wire connections may be exposed. The exposed arrangement of the winding wire connections when the cover is removed enables unobstructed access to the winding wire connections when connecting or making a connection with the winding wires, for example by soldering. This makes it possible to connect the winding wires by soldering on an automated soldering line. The winding wire connections are exposed, after the main body was equipped with the electrical connection assemblies beforehand. In this or other embodiments, the winding wire connections are arranged at the bottom, beneath the spring-force clamping connection.

The cover may comprise an internally projecting partition wall, which is arranged at least partially in the space between the first and the second winding wire connection when the cover is mounted on the main body and is configured to provide further electrical insulation. When the cover is mounted on the main body, the protruding partition wall may engage in an assigned wall guide on the main body, for example a slot guide arranged between the first and the second electrical connection, while the cover is positioned on the main body and also after the assembly. With the aid of the partition wall made from electrically insulating material which is then arranged between the first and the second winding wire connections, a complete insulation intended for the transformer terminal is formed, particularly regarding the electrical insulation between the two electrical conductor connections.

The main body may comprise a cross-connection channel, in which a cross-connector is arrangeable, with which the first and the second electrical conductor connections may be electrically connectable. The cross-connection channel extends as a cavity transversely to the longitudinal direction of the bus bars and may be arranged on the rear side of the main body and optionally adjacent to the mounting device. The cross-connector, which provides an electrical contact capability with the first and the second electrical conductor connections, may be arranged in the cross-connection channel to connect said connections.

The mounting device may comprise a plug-in device which is configured to plug the insulating housing on the transformer in a plug socket. The plug-in device may be formed on the main body with a clip, for example, which is attached to the transformer on an assigned assembly section.

The first and the second bus bar for the transformer terminal may each be formed as a single-part bending component from a flat metal material. The bus bars may thus be manufactured simply and as mass production items starting from a flat metal material by means of several forming and bending processes.

Guides assigned to each other may be formed on the main body and on the cover for the transformer terminal. The mutually assigned guides may comprise projections and depressions which are formed for example on exterior surfaces of the main body and on interior surfaces of the cover, and cooperate during the assembly and disassembly of the cover. In these or other variants, a detent connection may be formed between the main body and the cover in the end position thereof when the cover is mounted on the main body.

DESCRIPTION OF EMBODIMENTS

In the following text, further embodiments will be explained with reference to the figures of drawing. In the drawing.

Figure 1:
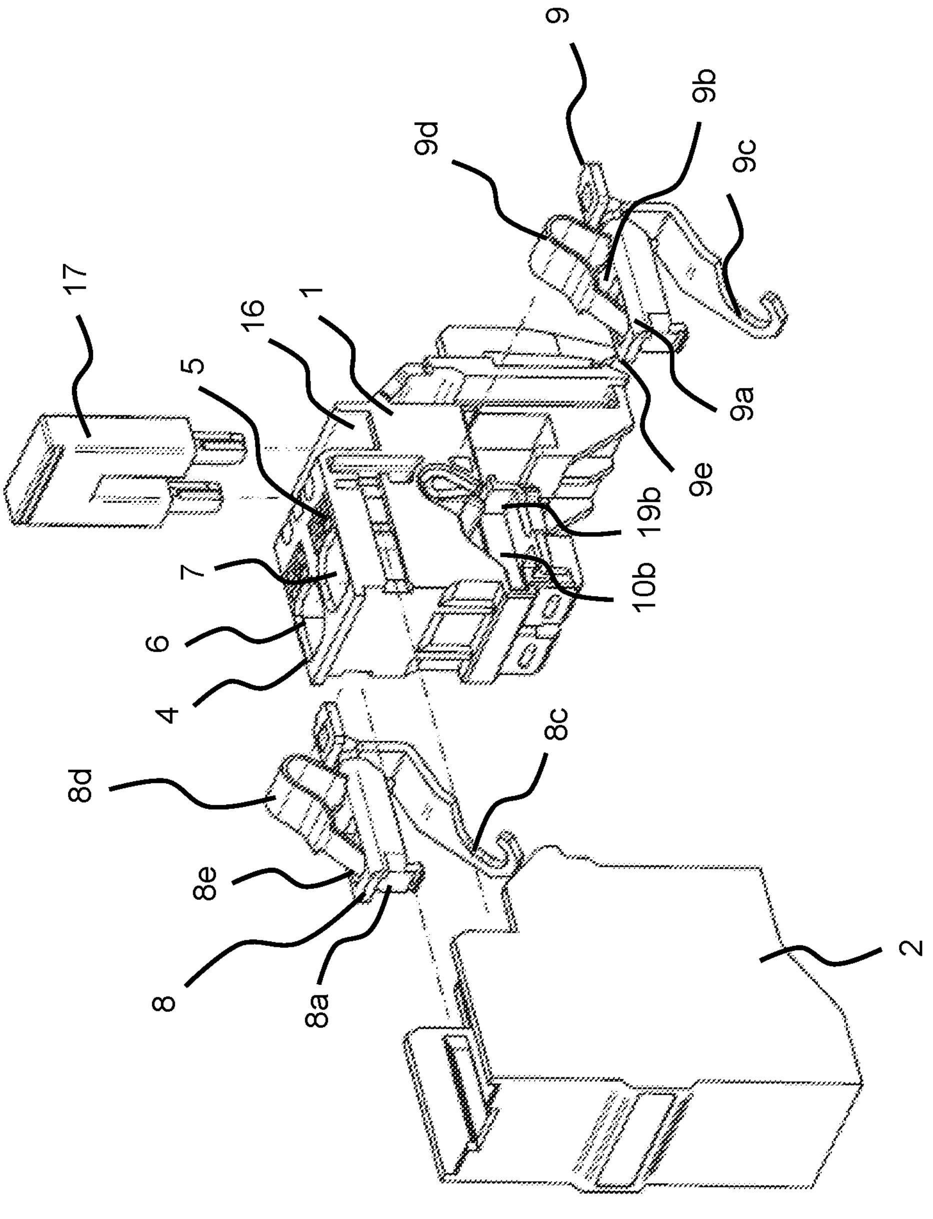
FIG. 1 is a schematic, perspective representation of an arrangement with components for a transformer terminal having two conductor connections which are electrically insulated from each other.

FIG. 1 shows a schematic, perspective representation of components or elements of a transformer terminal. A main body 1 is provided, which together with a cover 2 forms an insulating housing 3.

Figure 5:
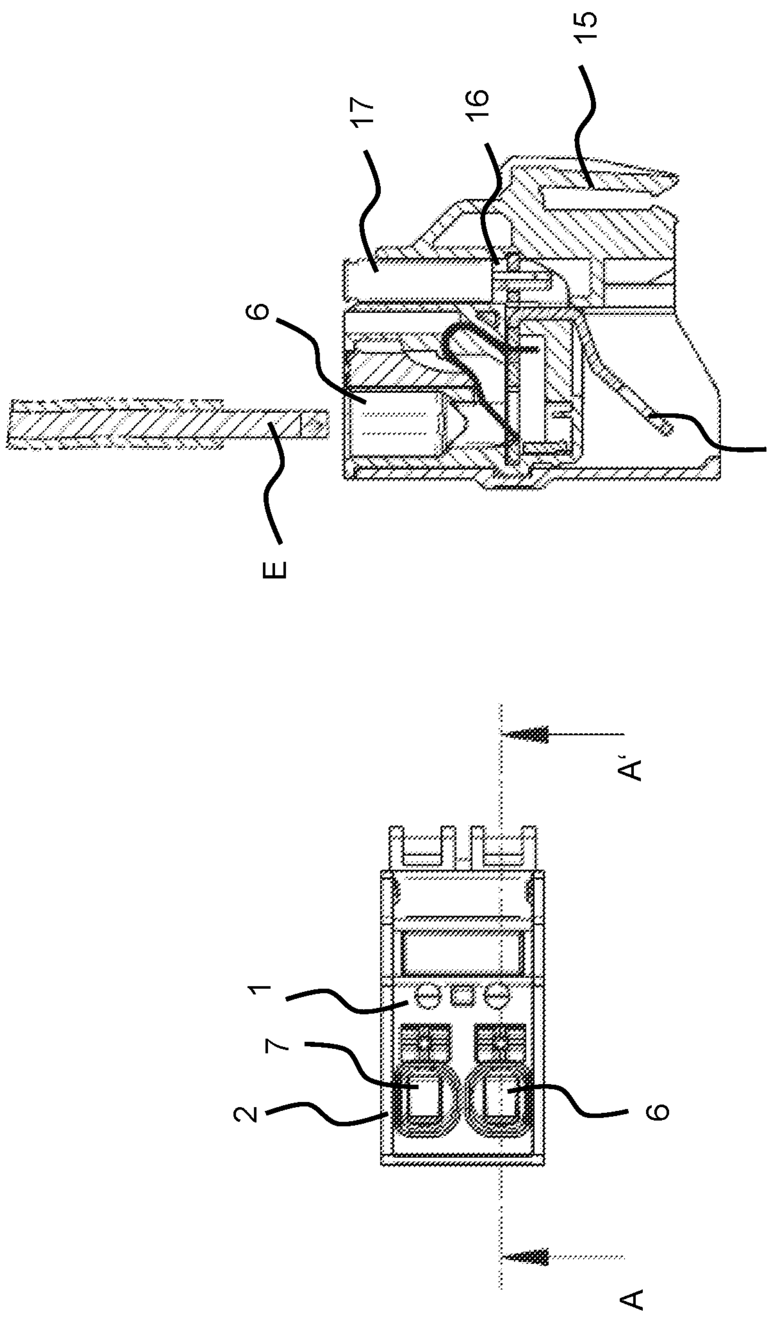
FIG. 5 is a schematic representation of the transformer terminal of FIG. 4 from above and in cross-section along a line AA'.

A first and a second electrical conductor connection 4, 5 are formed on the main body 1, each being configured to receive a conductor end E through a first and a second socket opening 6, 7 (see cross-section diagram in FIG. 5) for electrical connection. A first and a second electrical connection assembly 8, 9, each comprising a bus bar **8*a*, 9*a*, a spring-force clamping connection 8*b*, 9*b* and a winding wire connection 8*c*, 9*c*, are assigned to the socket openings 6, 7. The spring-force clamping connection 8*b*, 9*b* is designed as a socket spring connection actuated by a spring 8*d*, 9*d*. When the conductor end (not shown) is inserted, it presses against the spring 8*d*, 9*d* and is plugged into an assigned opening 8*e*, 9*e* in the bus bar 8*a*, 9*a*, and then pressed against the bus bar 8*a*, 9*a* by means of the spring 8*d*, 9*d***.

Figure 2:
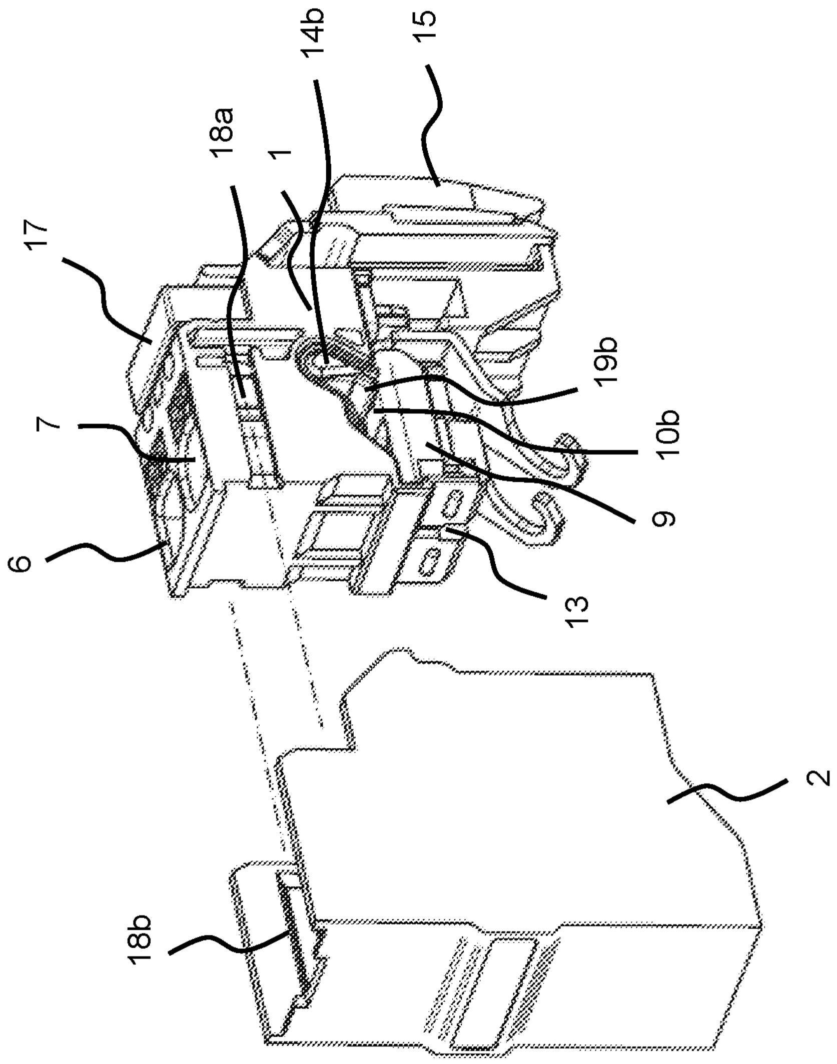
FIG. 2 is a schematic, perspective representation of a transformer terminal in which a cover is detached from the main body.
Figure 6:
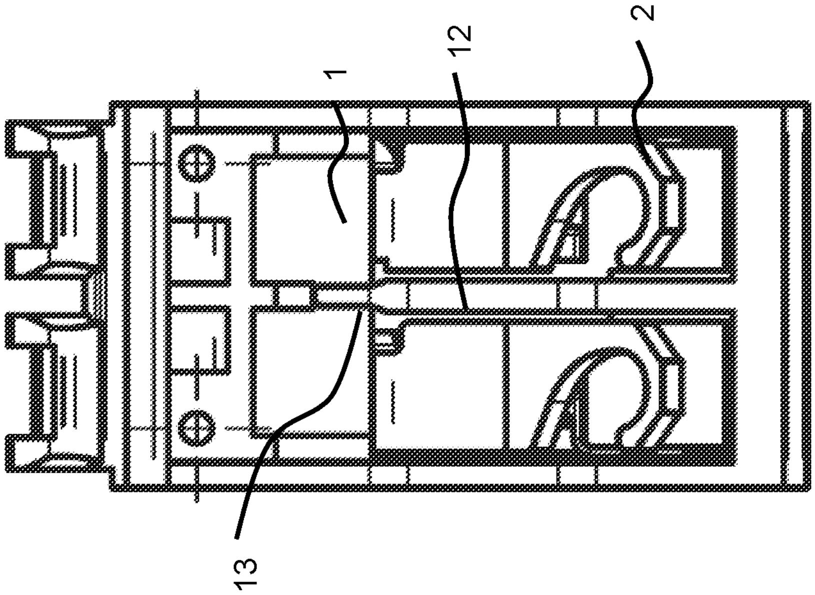
FIG. 6 is a schematic representation of the transformer terminal of FIG. 4 from below.

The bus bars **8*a*, 9*a* are each integrally designed, in particular single parts, in the variant shown produced as bending parts from a flat metal material. In the lower region, the winding wire connections 8*c*, 9*c* are each constructed with a solder tail which is configured to allow the winding wires of a transformer (not shown) to be connected by soldering. As shown in FIG. 2, the winding wire connections 8*c*, 9*c* are exposed when the first and the second electrical connection assemblies 8, 9 are assembled in an assigned first and second installation space 10*a*, 10*b* on the main body 1. This exposure makes it possible to connect the winding wires to the winding wire connections 8*c*, 9*c* by means of automated soldering. An interspace 11 between the winding wire connections 8*c*, 9*c* is also exposed before assembly of the cover 2. When the cover 2 is then arranged on the main body 1 (see FIG. 4), a partition wall 12, which is formed on the inside of the cover, slides between the winding wire connections 8*c*, 9*c* to complete the electrical insulation of the transformer terminal. Thus the partition wall 12 engages in a slot 13 on the main body 1 (see FIGS. 2, 3 and 6**).

Figure 3:
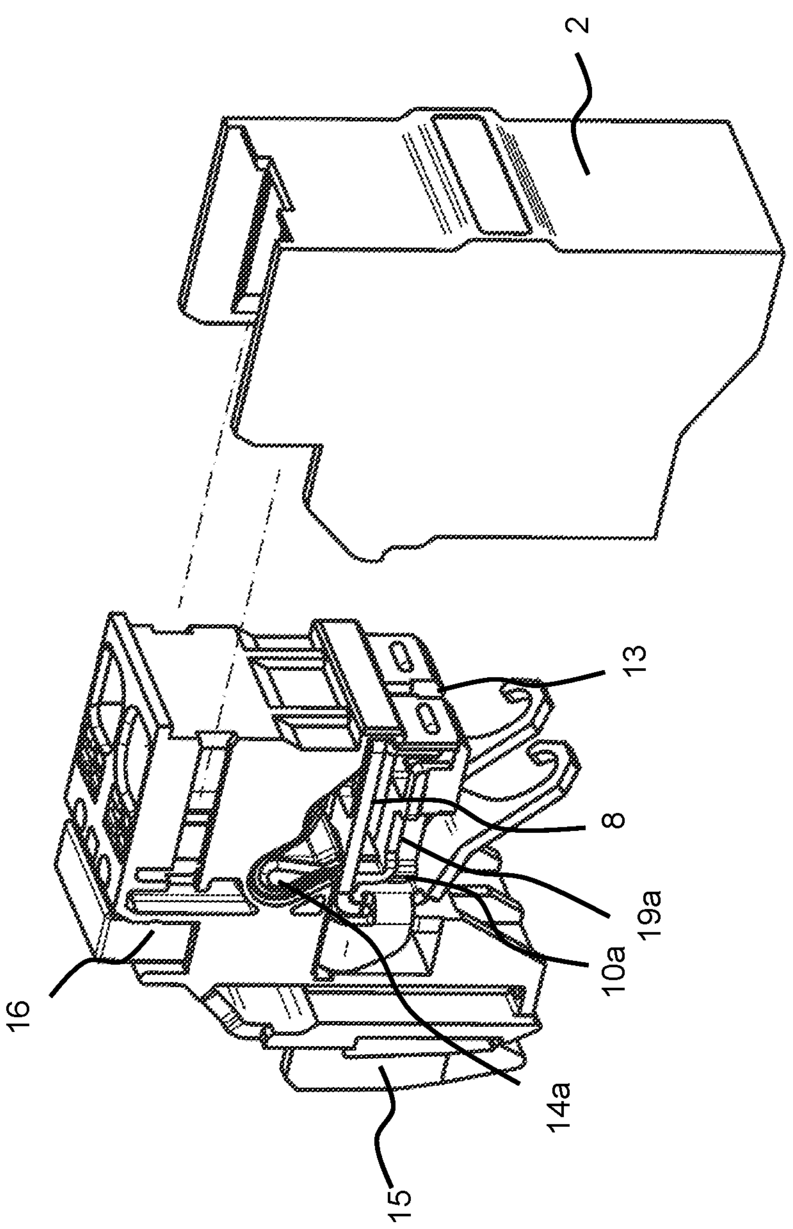
FIG. 3 is another schematic, perspective representation of the transformer terminal of FIG. 2 from the opposite side.
Figure 4:
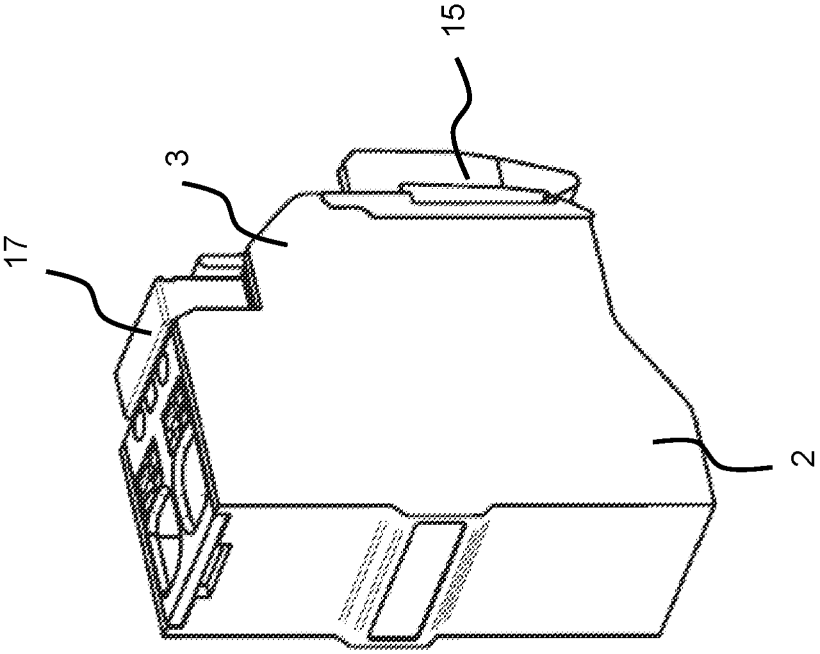
FIG. 4 is a schematic, perspective representation of the transformer terminal of FIGS. 2 and 3, wherein the cover is mounted on the main body.

As shown in the diagrams of FIGS. 2 and 3, in the assembled position on the main body 1, the spring **8*d*, 9*d* encompasses a respective support mandrel 14*a*, 14*b*, which in the embodiment shown is formed with a teardrop shape. This serves as mechanical stabilisation for the spring 8*d*, 9*d*** during operation, particularly in respect of overextension or overloading.

As shown in FIG. 1, the first and the second electrical connection assemblies 8, 9 may be mounted in the installation space **10*a*, 10*b*** assigned to each either simultaneously or consecutively from opposite sides.

A mounting device 15 is provided on the main body 1 which is used to mount the transformer terminal on a transformer (not shown), for example by plugging.

As shown in FIG. 1, the main body 1 further comprises an accommodation space 16 for a cross-connector 17 so as to create an electrical connection between the first and the second electrical connection assemblies 8, 9 via the cross-connector 17 on demand. In this context, the accommodation space 16 may initially be designed and provided as an empty cavity. The cross-connector 17 may then be mounted as required by the application situation.

Guides 18*a*, 18*b* are provided on the main body 1 and on the cover 2 (see FIG. 2) and these engage when the cover 2 is mounted on the main body 1.

The first and the second connection assemblies 8, 9 are equipped from opposite sides of the main body 1 through a respective mounting opening 19*a*, 19*b* on the main body 1 (see FIG. 1), either at the same time or at different times.

The features disclosed in the preceding description, the claims and the drawing may be relevant either alone or in any combination for the realisation of the different embodiments.

The invention claimed is:

1. A transformer terminal, comprising:

an insulating housing, having an integrally designed main body, and a cover which is detachably mounted on the main body;

a mounting device which is formed on the insulating housing and is configured to mount the insulating housing on a transformer;

a first electrical conductor connection for a first potential, comprising a first electrical connection assembly having a first bus bar;

a first spring-force clamping connection, which is formed on the first bus bar and is configured to clamp a first conductor for electrical connection to the first bus bar; and a first winding wire connection for electrically connecting a first winding wire of the transformer to the bus bar, the first winding wire connection being integrally moulded on the first bus bar; and a second electrical conductor connection for a second potential different from the first potential, the first and the second electrical conductor connections being electrically insulated from each other, the second electrical conductor connection comprising a second electrical connection assembly with a second bus bar;

a second spring-force clamping connection which is formed on the second bus bar and is configured to clamp a second conductor for electrical connection to the second bus bar; and a second winding wire connection for electrically connecting a second winding wire of the transformer to the bus bar, the second winding wire connection being integrally moulded on the second bus bar;

the first electrical connection assembly being arranged in a first installation space, which is formed on the main body in the region of a lateral face with a first mounting opening toward the lateral face, and the second electrical connection assembly being arranged in a second installation space which is formed on the main body in the region of an opposite lateral face with a second mounting opening toward the opposite lateral face and separated from the first installation space.

2. The transformer terminal according to claim 1, wherein the first and the second spring-force clamping connection are each designed as a socket spring connection.

3. The transformer terminal according to claim 1, wherein the first installation space is equippable with the first electrical connection assembly through the first mounting opening in the region of the lateral face, and the second installation space is equippable with the second electrical connection assembly through the second mounting opening in the region of the opposite lateral face.

4. The transformer terminal according to claim 1, further comprises a first spring of the first spring-force clamping connection in the first installation space at least partially encompasses a first support mandrel configured to prevent an overextension of the spring, and a second spring of the second spring-force clamping connection in the second installation space at least partially encompasses a second support mandrel configured to prevent an overextension of the spring.

5. The transformer terminal according to claim 1, wherein, the first and the second electrical connection assemblies are constructed identically, at least with regard to the following components: the bus bar, the spring-force clamping connection, and the winding wire connection.

6. The transformer terminal according to claim 1, wherein the first and the second winding wire connections are formed with a solder connection.

7. The transformer terminal according to claim 1, wherein the first and the second winding wire connections are arranged such that they are exposed when the cover is removed from the main body, wherein also an interspace between the first and the second winding wire connections is exposed.

8. The transformer terminal according to claim 7, wherein the cover comprises an internally projecting partition wall, which is arranged at least partially in the space when the cover is mounted on the main body and is configured to provide further electrical insulation.

9. The transformer terminal according to claim 1, wherein the main body contains an accommodation space, in which a cross-connector is arrangeable, with which the first and the second electrical conductor connections are electrically connectable.

10. The transformer terminal according to claim 1, wherein the mounting device comprises a plug-in device which is configured to plug the insulating housing on the transformer in a plug socket.

11. The transformer terminal according to claim 1, wherein the first and the second bus bar are each formed as a single-part bending component from a flat metal material.

12. The terminal according to claim 1, wherein mutually assigned guides are formed on the main body and on the cover.

* * * * *